(12) United States Patent
Schuette et al.

(10) Patent No.: US 9,109,134 B2
(45) Date of Patent: Aug. 18, 2015

(54) COMBINED WARP SIZING AND FIXING AGENT AND NEW METHOD FOR FIXING SULFUR DYESTUFFS ON WARP

(75) Inventors: Richard Schuette, Auggen (DE); Manel Jimenez, Castellar del Vallés/Barcelone (ES)

(73) Assignee: CLARIANT FINANCE (BVI) LIMITED, Tortola (VG)

( * ) Notice: Subject to any disclaimer, the term of this patent is extended or adjusted under 35 U.S.C. 154(b) by 262 days.

(21) Appl. No.: 13/581,873

(22) PCT Filed: Mar. 2, 2011

(86) PCT No.: PCT/EP2011/001033
§ 371 (c)(1),
(2), (4) Date: Oct. 30, 2012

(87) PCT Pub. No.: WO2011/110303
PCT Pub. Date: Sep. 15, 2011

(65) Prior Publication Data
US 2013/0198975 A1 Aug. 8, 2013

(30) Foreign Application Priority Data

Mar. 9, 2010 (EP) .................................. 10002401

(51) Int. Cl.
| | | |
|---|---|---|
| D06M 15/423 | (2006.01) | |
| C09D 103/00 | (2006.01) | |
| C08G 73/02 | (2006.01) | |
| C08L 1/28 | (2006.01) | |
| C08L 3/04 | (2006.01) | |
| C08L 3/08 | (2006.01) | |
| D06M 13/46 | (2006.01) | |
| D06M 15/11 | (2006.01) | |
| D06M 15/427 | (2006.01) | |
| D06P 1/48 | (2006.01) | |
| D06P 1/655 | (2006.01) | |
| D06P 1/66 | (2006.01) | |
| D06P 3/00 | (2006.01) | |

(52) U.S. Cl.
CPC .............. *C09D 103/00* (2013.01); *C08G 73/02* (2013.01); *C08G 73/0226* (2013.01); *C08G 73/0293* (2013.01); *C08L 1/288* (2013.01); *C08L 3/04* (2013.01); *C08L 3/08* (2013.01); *D06M 13/46* (2013.01); *D06M 15/11* (2013.01); *D06M 15/427* (2013.01); *D06P 1/48* (2013.01); *D06P 1/655* (2013.01); *D06P 1/66* (2013.01); *D06P 3/003* (2013.01)

(58) Field of Classification Search
CPC ........... C08G 73/0293; C08G 73/0226; C09D 103/00; C08L 3/04; D06M 13/46; D06M 15/11; D06M 15/427
USPC ..................... 8/115.6, 495; 523/447
See application file for complete search history.

(56) References Cited

U.S. PATENT DOCUMENTS

| | | | | |
|---|---|---|---|---|
| 4,311,601 | A | * | 1/1982 | Racciato ...................... 252/8.83 |
| 4,726,809 | A | * | 2/1988 | DeBoer et al. ................. 8/115.6 |
| 2006/0276370 | A1 | | 12/2006 | Zhang et al. |
| 2010/0056420 | A1 | * | 3/2010 | Corona et al. ................ 510/341 |

FOREIGN PATENT DOCUMENTS

| | | |
|---|---|---|
| DE | 37 16 755 | 11/1987 |
| EP | 0 609 994 A1 | 8/1994 |
| GB | 1 589 483 | 5/1981 |
| JP | 54-160885 A | 12/1979 |
| WO | 2012/163498 A1 | 12/2012 |

OTHER PUBLICATIONS

STIC Search Report dated Jul. 9, 2014.*
STIC Search Report dated Oct. 14, 2014.*
International Search Report dated Jun. 1, 2011, issued in Application No. PCT/EP2011/001033.

* cited by examiner

*Primary Examiner* — Eisa Elhilo
(74) *Attorney, Agent, or Firm* — Miles & Stockbridge, P.C.

(57) ABSTRACT

Combined warp sizing and fixing agent and new method for fixing sulfur dyestuffs on warp. The invention relates to a new warp sizing and fixing agent comprising a combination of modified cationic starch and cationic fixing agent. Such new warp sizing and fixing agent is suitable to be used in fully continuous dyeing processes, if desired in combination with additional sizing additives.

17 Claims, No Drawings

COMBINED WARP SIZING AND FIXING AGENT AND NEW METHOD FOR FIXING SULFUR DYESTUFFS ON WARP

The invention relates to a warp sizing and fixing agent comprising a mixture of cationic starch and cationic fixing agent and optionally in addition sizing additives. The new warp sizing and fixing agent is perfectly suitable to improve sizing and dyeing of warp yarn using sulfur dyestuffs and indigo dyestuff in continuous processes.

Dyeing of warp yarn for Denim is usually performed by indigo dyestuff and also by sulfur dyestuffs on special continuous dyeing ranges. The warp passes thereby through the range as rope or in wide form, such as so called slasher. The reduced (=leuko) dyestuff is thereby applied in boxes with squeezing devices, thereafter oxidized in air, then dried and finally subjected to a sizing process necessary to improve the mechanical strength of the yarn for its subsequent further processing by weaving. For such sizing purposes usually natural or synthetic polymer agents are employed, e.g. starch or polyvinyl alcohol.

Sulfur dyestuffs may be applied as a simple color or either in bottoming with indigo, that means sulfur dyes are applied before indigo, or in topping with indigo, that means sulfur dyes are applied after indigo.

The dyeing process usually does not achieve to fix 100% of the sulfur dyestuff on the fiber. For that reason, unfixed dyestuff contaminates the sizing liquor as well as the sized yarn. Such contamination is often the reason for disadvantageous backstaining of the backside of the fabric during weaving and finishing and must be removed by washing with water. Apart from the high amount of water actually needed for dyeing and sizing, the contamination of waste water, especially that from the dyeing process, is one of the main environmental challenge currently facing the textile industry.

An object underlying the present invention was therefore to provide a new agent for fixing sulfur dyestuff on the yarn while sizing the yarn simultaneously which can be applied in one step and can be removed thereafter more simply, say, by only one washing step. The new agent thus needs a lower amount of water in a continuous process and helps to improve the environmental influence of the textile industry.

Surprisingly, it was found that this objective was achieved by a warp sizing and fixing agent comprising a combination of a cationic starch with a cationic fixing agent and optionally in addition sizing additives.

Therefore, the present invention pertains to a warp sizing and fixing agent comprising a combination of:
a) a cationic starch substituted with quaternary ammonium groups,
b) a cationic fixing agent and optionally
c) additional sizing additives.

It was surprisingly found that the combination of a cationic starch and cationic fixing agent is suitable to improve sizing and dyeing of warp yarn using sulfur dyestuffs and/or indigo in a continuous process, thereby minimizing the overall water consumption and, in addition, the resulting amount of waste water, whereby the waste water does not contain any considerable amount of dyestuff.

Another important advantage of the present invention is the possibility that the simultaneous dyeing and sizing process can be performed on conventional machine equipment comprising a station for impregnation with the dye liquor (padding), usually performed at temperatures of from 60 to 90° C., a station for migration and diffusion of the dyestuff under air (skying), a station for direct impregnation, usually performed at a pH-value of from 4.5 to 5 over a time period of from 20 to 200 sec and at a temperature of from 65 to 85° C., and a final station for washing and rinsing, usually performed at a temperature of from 50 to 80° C. and a sizing station for application of sizing agent and fixation, usually performed at a temperature from 65 to 90° C., and drying section.

The preparation of a cationic starch is described in U.S. Pat. No. 2,946,705 B1 or in DE 37 16 755 A1 wherein the cationic starch is additionally esterified with acyl groups. Both types of cationic starch, i.e. with or without ester groups, can be used in the present invention. The cationization of the starch is performed by reacting starch with a quaternary ammonium salt.

Expediently, the cationic starch is prepared by first providing an aqueous suspension of starch and combining that aqueous suspension with a quaternary ammonium reagent, preferably an epoxy compound. The reaction takes place in the presence of a basic catalyst at a temperature in the range of from 40 to 60° C. and over a time period of from 10 to 20 hours.

Optionally, after that reaction, the reaction product is subjected to an esterification with a respective carboxylic acid or carboxylic acid derivative, such as an anhydride, acid halogenide or an ester. Thereafter the esterified cationic starch is isolated by washing and drying.

The cationic starch a) according to the present invention preferably has the formula (1a) or (1b)

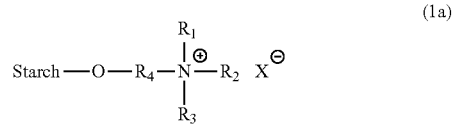

(1a)

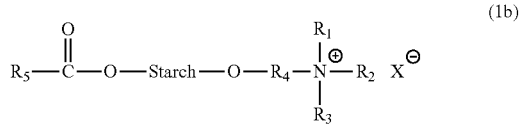

(1b)

wherein
$R_1$, $R_2$ and $R_3$ are identical or different and represent $C_1$-$C_6$-alkyl, $C_6$-$C_{10}$-aryl, $C_7$-$C_{12}$-aralkyl whereby said alkyl, aryl and aralkyl groups are optionally substituted with hydroxyl, methyl, ethyl, methoxy, ethoxy, nitro, fluoro, chloro, bromo, cyano or carboxymethyl;

X stands for halogen, preferably chlorine or bromine, and $R_4$ stands for an alkylene group or an hydroxyalkylene group each having 2 to 5 carbon atoms;

$R_5$ stands for hydrogen or a $C_1$-$C_6$-alkyl group optionally substituted with hydroxyl, methoxy, ethoxy, fluoro, chloro, bromo, nitro.

Usually, the ammonium ether group and the acyl ester group in formula (1b) are not linked to the same anhydroglucose moiety.

In a preferred embodiment, $R_1$, $R_2$ and $R_3$ are identical or different and represent $C_1$-$C_4$-alkyl, especially methyl or ethyl.

In a preferred embodiment, $R_4$ represents ethylene or propylene.

In a preferred embodiment, $R_5$ is $C_1$-$C_4$-alkyl, especially ethyl or propyl.

The term "starch" includes untreated starch as well as starch derivatives, including dextrinized, hydrolyzed, oxidized, and etherified starches still retaining amylaceous material. The starches may be derived from any sources including corn, wheat, potato, tapioca, sago or rice.

The cationic starch has preferably a degree of substitution with respect to the quaternary ammonium group of from 0.02 to 0.2, preferably from 0.03 to 0.1. If applicable, the cationic starch has preferably a degree of substitution with respect to the acyl ester group of from 0.01 to 0.3, preferably from 0.03 to 0.2.

In a preferred embodiment, a cationic starch according to formula (1a) is used.

The cationic fixing agent (b) according to the present invention is an organic compound comprising nitrogen and having the following general formula (2):

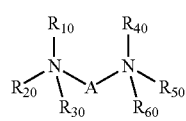

(2)

in which

A stands for alkylene having 1 to 6 carbon atoms optionally substituted by halogen, e.g. F, Cl or Br, hydroxy, $C_1$-$C_4$-alkoxy, e.g. methoxy and ethoxy, or nitro groups; or A stands for alkylene having 1 to 6 carbon atoms having incorporated one or more heteroatoms like N, S or O, and $R_{10}$ to $R_{60}$ stand independently from each other for optionally substituted $C_1$-$C_4$-alkyl groups, optionally substituted $C_1$-$C_4$-alkenyl groups, wherein the substituents are cyano, hydroxyl, $C_1$-$C_4$-alkylamino, methoxy, ethoxy, F, Cl, or Br; or $R_{10}$ and/or $R_{40}$ stand for hydrogen or an electron pair; or $R_{10}$ to $R_{60}$ are bridged with each other thereby constituting a ring system.

Typical fixing agents useful for the instant invention are poly-dimethyl-diallylammonium chloride, a polycondensate of diethylene triamine with epichlorohydrine, the reaction product of dicyano diamine with formaldehyde, and the reaction product of diethylene triamine with dicyano diamine.

The fixing agents as described before are suitable to fix sulfur dyestuffs on the warp yarn with high efficiency and up to 100%.

As sulfur dyestuffs all known sulfur dyestuffs can be employed preferably those (leuco)sulfur dyestuffs as comprised in the following list are suitable:

| Colour Index | CAS number |
|---|---|
| L.S. Black 1 | 66241-11-0 |
| L.S. Black 11 | 90480-94-7 |
| L.S. Red 14 | 58585-53-5 |
| L.S. Blue 7 | 69900-21-6 |
| L.S. Blue 13 | 12262-26-9 |
| R.V. Blue 43 | 85940-25-6 |
| L.S. Blue 20 | 85940-25-6 |
| L.S. Blue 9 | 12262-25-8 |
| L.S. Green 11 | 12262-52-1 |
| L.S. Green 2 | 12262-32-7 |
| L.S. Blue 15 | 100208-97-7 |
| L.S. Green 16 | 70892-38-5 |
| L.S. Brown 3 | 100208-66-0 |
| L.S. Yellow 9 | 85737-01-5 |
| L.S. Brown 96 | 85736-99-8 |
| L.S. Brown 10 | 12262-27-0 |
| L.S. Red 10 | 1326-96-1 |
| L.S. Brown 31 | 1327-11-3 |
| L.S. Brown 37 | 70892-34-1 |
| L.S. Brown 46 | 85940-08-5 |
| L.S. Orange 1 | 1326-49-4 |

| Colour Index | CAS number |
|---|---|
| L.S. Yellow 22 | 90268-98-7 |
| L.S. Brown 26 | 71838-68-1 |
| L.S. Green 36 | 90295-17-3 |

All these sulfur dyestuffs, according to the present invention, may be combined with or replaced by conventional indigo having the following chemical formula:

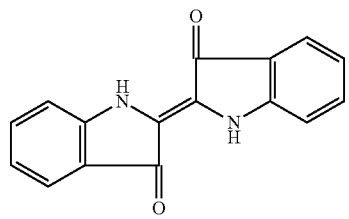

2-(1,3-dihydro-3-oxo-2H-indol-2-ylidene)-1,2-dihydro-3H-indol-3-one

The warp sizing and fixing agent pursuant to the instant invention comprises the cationic starch and the cationic fixing agent in a relation of from 1 weight unit cationic starch to 0.01 to 10, preferably to 0.02 to 1, more preferably to 0.05 to 0.15, weight units cationic fixing agent.

The warp sizing and fixing agent according to the instant invention may be combined in addition with further sizing additives, preferred in an amount of 0.01 to 0.15 parts by weight of said further sizing additives, relative to 1 part by weight of cationic starch. Such sizing additives are added to the sizing liquor to support the weaving process by their softening, smoothing or antistatic effects. Other sizing additives are antifoaming agents or means to increase the liquor pickup. Sizing fats are used advantageously to improve the dry splitting and weaving behavior of the warp by plasticizing the sizing film, providing a smoothing and antistatic action without reducing the adhesion and abrasion resistance of the sizing agent. Suitable materials include sulfated fats and oils and preparations of fatty acid esters with non ionic and anionic emulsifiers. Antistatic surfactants based on poly(glycol ethers) may also be added to reduce the static charge. Polyethylene glycol having a molecular mass of about 4000 may also be used as sizing fats, as well as self-emulsifying paraffin-free waxes based on fatty acids.

The liquor pickup during sizing depends partly on the wettability of the yarn. To support the pickup, a low foam wetting agent may be added in low amounts of up to 1 g/l. Suitable wetting agents are fatty alcohols or poly(glycol ethers) with a low degree of ethoxylation.

If the sizing agent used tends to produce foam or if wetting agents are added, the addition of a defoaming agent is sometimes desirable. Suitable products can be based on paraffin oil, phosphoric esters, fatty acid esters or silicone oils.

Sizing liquors which are stored over a long time period and contain biologically degradable ingredients such as starch or starch derivatives must be protected against degradation by adding fungicides and/or bactericides. Suitable agents are formaldehyde or formaldehyde-releasing substances, phenol derivatives and heterocyclic compounds of the isothiazoline type.

WORKING EXAMPLES 1 TO 28

Starch cationic type (A) was a corn starch comprising 0.25 to 0.35% bound nitrogen in dry substance (=degree of cationization), Starch cationic type (B) was a potato starch comprising 0.30 to 0.35% bound nitrogen in dry substance, and Starch cationic type (C) was a potato starch comprising 0.25 to 0.30% bound nitrogen in dry substance.

In Starch A, B and C the ammonium ether group is hydroxypropyl-trimethyl-ammonium chloride.

Starch C additionally has an acetyl group with a degree of substitution of about 0.1% in dry substance.

Examples 1 to 4 are comparison tests, whereas examples 5, 6 and 7 are in accordance with the invention.

Table 1 shows the qualitative composition of warp sizing and fixing mixtures used later on for the working examples:

|  | Example N° (sizing additives/weight units) | | | | | | |
| --- | --- | --- | --- | --- | --- | --- | --- |
|  | 1 | 2 | 3 | 4 | 5 | 6 | 7 |
| Starch | 1 |  |  |  |  |  |  |
| Starch cationic type (A) |  | 1 |  |  | 1 |  |  |
| Starch cationic type (B) |  |  | 1 |  |  | 1 |  |
| Starch cationic type (C) |  |  |  | 1 |  |  | 1 |
| Fixing agent (= polycondensate of diethylene triamine with epichlorohydrine) |  |  |  |  | 0.1 | 0.1 | 0.1 |

For these mixtures in different concentrations 8%, 6% and 4% fordcup viscosity tests have been performed to figure out and demonstrate their quality and suitability for their application for sizing yarn in an optimum way and with optimum result.

The following table 2 shows the result of the fordcup viscosity tests.

TABLE 2

|  | Example N° (Result of sizing) | | | | | | |
| --- | --- | --- | --- | --- | --- | --- | --- |
|  | 1 | 2 | 3 | 4 | 5 | 6 | 7 |
| Liquor conc. 8% [s][1] | 19 | >100 | >100 | 85 | >100 | >100 | >100 |
| Liquor conc. 6% [s][1] | 15 | >100 | 58 | 40 | >100 | 76 | 45 |
| Liquor conc. 4% [s][1] | 12 | 94 | 36 | 30 | 38 | 30 | 22 |
| Polyester slivers [cN/tex][2] | 0.15 | 0.41 | 0.31 | 0.25 | 0.54 | 0.46 | 0.42 |
| Cotton slivers [cN/tex][2] | 0.09 | 0.8 | 0.19 | 0.27 | 0.69 | 0.54 | 0.51 |

[1]The "fordcup" viscosity of the sizing liquor is determined according to an internal method as follows: 500 ml of the sizing liquor, whereby the solvent is water, are first heated to a constant temperature of 85° C., as well as the fordcup itself which is equipped with an outflow die. Thereafter the fordcup is plunged into the sizing liquor and filled completely, whereby any air bubbles have to be avoided, carefully. Then, the fordcup is hold horizontally over the edge of a beaker and the time is taken in seconds [s] until the liquor is flowing constantly through the outflow die is subjected to interruption for the first time.
[2]The determination of slivers is made according to an internal method, as well. Accordingly, carden stripes are impregnated with a 1% strength by weight of sizing liquor, then cut into a length of about 30 cm, whereby each determination needs seven (7) individual stripes. The sized carden stripes are dried in a cabinet over a time period of 2 h at a temperature of 60° C. Thereafter they are kept over a time period of 24 h in an air-conditioned chamber at 23° C. and under a relative humidity of 65%. Thereafter they are torn to break in a tear measurement machine. The resulting slivers is given by the tear strength at break divided through fiber titer in tex [cN/tex].

To demonstrate further improvement in sizing quality, some more mixtures according to the following examples 8 to 14 have been prepared using additional sizing additives. Example 8 is a comparison test, whereas examples 12 to 14 are in accordance with the invention.

TABLE 3

|  | Example N° (sizing additives/weight units) | | | |
| --- | --- | --- | --- | --- |
|  | 8 | 12 | 13 | 14 |
| Starch | 1 |  |  |  |
| Starch cationic type (B) = invention |  | 1 | 1 | 1 |

TABLE 3-continued

|  | Example N° (sizing additives/weight units) | | | |
| --- | --- | --- | --- | --- |
|  | 8 | 12 | 13 | 14 |
| Sizing softener (= emulsified triglyceride) | 0.01 | 0.01 | 0.02 | 0.03 |
| Wetting agent (= polyglycol ether) | 0.01 | 0.01 | 0.02 | 0.03 |
| Fixing agent (= polycondensate of diethylene triamine with epichlorohydrine) |  | 0.1 | 0.1 | 0.1 |

After careful preparation according to the measurement as described before, the slivers have been determined. The results are given in the following Table 4 and show that the sizing quality for examples 12 to 14 is very satisfactory, whereas the comparative test of example 8 is only poor in result.

TABLE 4

|  | Example N° results | | | |
| --- | --- | --- | --- | --- |
|  | 8 | 12 | 13 | 14 |
| Polyester slivers [cN/tex] | 0.15 | 0.42 | 0.45 | 0.44 |
| Cotton slivers [cN/tex] | 0.09 | 0.52 | 0.53 | 0.53 |

EXAMPLES 15 TO 21

In the following examples 15 to 21 the combined sizing and dyeing procedure was performed in a continuous process of sizing comprising a padding step with the sizing agent having a liquor concentration of 8% on the warp material at a pH-value of 4.7 at a temperature of 85° C. with a wet size pick up of 110% followed by a drying process at 125° C. for 60 sec.

After that sizing the yarn was rinsed in two steps with water at a temperature of 75° C. (=first step) and 65° C. (=second step).

The following Table 5 gives the respective composition of the sizing and dyeing liquor applied on the respective warp material. Example 15 is a comparison, Examples 16 to 21 are according to the invention.

TABLE 5

| | Example N° | | | | | | |
|---|---|---|---|---|---|---|---|
| | 15 | 16 | 17 | 18 | 19 | 20 | 21 |
| Warp material = 100% cotton, [tex 74/1] | + | + | + | + | + | + | + |
| Starch (weight unit) | 1 | | | | | | |
| Starch cationic type (B) = invention (weight units) | | 1 | 1 | 1 | 1 | 1 | 1 |
| Fixing agent (= polycondensate of diethylene triamine with epichlorohydrine (weight units) | | 0.1 | 0.08 | 0.06 | 0.04 | 0.02 | 0.01 |
| Application temp [° C.] | 90 | 70 | 70 | 70 | 70 | 70 | 70 |
| Dyestuff (CAS-No.) | 85940-25-6 | 85940-25-6 | 85940-25-6 | 85940-25-6 | 85940-25-6 | 85940-25-6 | 85940-25-6 |

After the sizing and dyeing procedure the quality was determined in terms of backstaining, whereby dyed yarn was washed together with not dyed yarn and it was observed of how much the not dyed yarn was colored (dyed) after washing. Further the liquor contamination after the washing step was observed optically and the shade variability was determined optically, as well.

The results are given in the following Table 6. The classification for backstaining was (++) for no backstaining over (+) and (−) to (−−) for strong backstaining. The classification for liquor contamination was (++) for no contamination over (+) and (−) to (−−) for strong contamination. The classification for shade variability was (++) for low variability over (+) and (−) to (−−) for high variability.

TABLE 6

| | Example N° Results | | | | | | |
|---|---|---|---|---|---|---|---|
| | 15 | 16 | 17 | 18 | 19 | 20 | 21 |
| Backstaining | (−−) | (++) | (++) | (++) | (−) | (+) | (−) |
| Liquor contamin. | (−−) | (++) | (++) | (++) | (+) | (−) | (−) |
| Shade variab. | (−) | (+) | (++) | (++) | (+) | (+) | (+) |

It becomes evident that the best results have been achieved in examples 16, 17 and 18 where relatively high amounts of fixing agent were employed, whereas examples 19, 20 and 21 show even better results as the comparative test of example 15.

EXAMPLES 22 TO 28

In the next following examples 22 to 28 the combined sizing and dyeing procedure was again applied under the conditions as already explained in connection with working examples 15 to 21, but comprising a different dyestuff. The following Table 7 gives the respective composition of the sizing and dyeing liquor having a concentration of 8% applied on the respective warp material. Example 22 is a comparative, Examples 23 to 28 are according to the invention.

TABLE 7

| | Example N° | | | | | | |
|---|---|---|---|---|---|---|---|
| | 22 | 23 | 24 | 25 | 26 | 27 | 28 |
| Warp material = 100% cotton, [tex 74/1] | + | + | + | + | + | + | + |
| Starch (weight unit) | 1 | | | | | | |
| Starch cationic type (B) = invention (weight units) | | 1 | 1 | 1 | 1 | 1 | 1 |
| Fixing agent (= polycondensate of di-ethylene triamine with epichlorohydrine (weight units) | | 0.1 | 0.08 | 0.06 | 0.04 | 0.02 | 0.01 |
| Application temp [° C.] | 90 | 70 | 70 | 70 | 70 | 70 | 70 |
| Dyestuff (CAS-No.) | 66241-11-0 | 66241-11-0 | 66241-11-0 | 66241-11-0 | 66241-11-0 | 66241-11-0 | 66241-11-0 |

After the sizing and dyeing procedure the quality was determined in terms of backstaining, liquor contamination and shade variability, as already described in connection with examples 15 to 21.

The results are given in the following Table 8, whereby the classification for backstaining for liquor contamination and for shade variability was the same as before.

TABLE 8

| | Example N° Results | | | | | | |
|---|---|---|---|---|---|---|---|
| | 22 | 23 | 24 | 25 | 26 | 27 | 28 |
| Backstaining | (−−) | (++) | (++) | (++) | (+) | (+) | (−) |
| Liquor contamin. | (−) | (++) | (++) | (++) | (+) | (−) | (−) |
| Shade variab. | (−) | (+) | (++) | (++) | (++) | (+) | (+) |

It becomes evident that again optimum results have been achieved in examples 23, 24 and 25 where relatively high amounts of fixing agent were employed, whereas examples 26, 27 and 28 show even better results as the comparative test of example 22.

The invention claimed is:

1. A warp sizing and fixing agent comprising a:
   a) cationic starch substituted with quaternary ammonium groups,
   b) a cationic fixing agent and optionally
   c) additional sizing additives,
   wherein the cationic starch (a) has the formula (1a) or (1b)

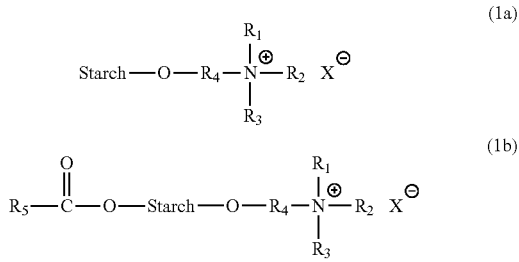

wherein $R_1$, $R_2$ and $R_3$ are identical or different and are $C_1$-$C_6$-alkyl, $C_6$-$C_{10}$-aryl or $C_7$-$C_{12}$-aralkyl, wherein said alkyl, aryl and aralkyl groups are optionally substituted with hydroxyl, methyl, ethyl, methoxy, ethoxy, nitro, fluoro, chloro, bromo, cyano or carboxymethyl;

X is a halogen, and

R4 is an alkylene group or a hydroxyalkylene group each having 2 to 5 carbon atoms:

R5 is hydrogen or a C1-C6-alkyl group optionally substituted with hydroxyl, methoxy, ethoxy, fluoro, chloro, bromo or nitro, and wherein the cationic fixing agent comprises an organic compound having the following general formula (2):

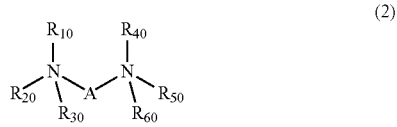

wherein

A is an alkylene having 1 to 6 carbon atoms optionally substituted by halogen, hydroxy, $C_1$-$C_4$-alkoxy, or nitro groups; or A stands for alkylene having 1 to 6 atoms having incorporated one or more heteroatoms N, S or O, and $R_{10}$ to $R_{60}$ stand independently from each other for optionally substituted $C_1$-$C_4$-alkyl groups, optionally substituted $C_1$-$C_4$-alkenyl groups, wherein the substituents are cyano, hydroxyl, $C_1$-$C_4$-alkylamino, methoxy, ethoxy, F, Cl or Br; or $R_{10}$ and/or $R_{40}$ are hydrogen or an electron pair; or $R_{10}$ to $R_{60}$ are bridged with each other thereby constituting a ring system.

2. The warp sizing and fixing agent according to claim 1, whereby the cationic starch has a degree of substitution with respect to the quaternary ammonium group of from 0.02 to 0.2.

3. The warp sizing and fixing agent according to claim 1, whereby the cationic starch is of formula (1b) and has a degree of substitution with respect to the ester group of from 0.01 to 0.3.

4. The warm sizing and fixing agent according to claim 1, whereby the cationic fixing agent is poly-dimethyl-diallylammonium chloride, a polycondensate of diethylene triamine with epichlorohydrine, the reaction product of dicyano diamine with formaldehyde, or the reaction product of diethylene triamine with dicyano diamine.

5. The warp sizing and fixing agent according to claim 1, comprising the cationic starch (a) and the cationic fixing agent (b) in a relation of from 1 weight unit cationic starch to 0.01 to 10 weight units cationic fixing agent.

6. A method for sizing and dyeing of warp yarn using sulfur dyestuffs and/or indigo comprising the step of applying the warp sizing and fixing agent according to claim 1 to the warp yarn.

7. The method according to claim 6 in a fully continuous process.

8. The warp sizing and fixing agent according to claim 1, wherein the cationic starch has a degree of substitution with respect to the quaternary ammonium group of from 0.03 to 0.1.

9. The warp sizing and fixing agent according to claim 1, wherein the cationic starch has a degree of substitution with respect to the ester group of from 0.03 to 0.2.

10. The warp sizing and fixing agent according to claim 1, wherein the cationic starch (a) has the formula (1a).

11. The warp sizing and fixing agent according to claim 1, wherein the cationic starch (a) has the formula (1b).

12. The warp sizing and fixing agent according to claim 5, comprising the cationic starch (a) and the cationic fixing agent (b) in a relation of from 1 weight unit cationic starch to 0.02 to 1 weight unit cationic fixing agent.

13. The warp sizing and fixing agent according to claim 5, comprising the cationic starch (a) and the cationic fixing agent (b) in a relation of from 1 weight unit cationic starch to 0.05 to 0.15 weight unit cationic fixing agent.

14. The warp sizing and fixing agent according to claim 1, wherein the additional sizing additives (c) are present.

15. The warp sizing and fixing agent according to claim 14, wherein the additional sizing additives (c) are present in an amount from 0.01 to 0.15 parts by weight relative to 1 part by weight of cationic starch (a).

16. Warp yarn sized with a composition according to claim 1.

17. The warp sizing and fixing agent according to claim 14, wherein the additional sizing additives (c) are sizing fats, wetting agents, defoamers, preservatives or a combination thereof.

* * * * *